(12) United States Patent
Benavides

(10) Patent No.: US 7,825,854 B2
(45) Date of Patent: Nov. 2, 2010

(54) SYSTEM AND METHOD FOR COMPENSATING FOR TEMPERATURE EFFECTS ON GPS TRANSPONDERS

(75) Inventor: Armando Benavides, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 866 days.

(21) Appl. No.: 11/737,497

(22) Filed: Apr. 19, 2007

(65) Prior Publication Data

US 2008/0258969 A1 Oct. 23, 2008

(51) Int. Cl.
*G01S 1/00* (2006.01)
(52) U.S. Cl. .................................. 342/357.02
(58) Field of Classification Search ................................
342/357.01–357.17
See application file for complete search history.

(56) References Cited

U.S. PATENT DOCUMENTS

| | | | | |
|---|---|---|---|---|
| 5,440,491 | A * | 8/1995 | Kawano et al. | 701/200 |
| 5,781,156 | A | 7/1998 | Krasner | |
| 5,812,961 | A | 9/1998 | Enge et al. | |
| 6,266,007 | B1 | 7/2001 | Lennen | |
| 6,373,432 | B1 | 4/2002 | Rabinowitz et al. | |
| 6,914,931 | B2 | 7/2005 | Douglas et al. | |
| 7,437,138 | B1 * | 10/2008 | Woo | 455/333 |
| 2007/0010212 | A1 * | 1/2007 | Torimoto et al. | 455/95 |

OTHER PUBLICATIONS

ION GNSS 18th International Technical Meeting of the Satellite Division, Sep. 13-16, 2005, Long Beach, CA, p. 1154-1159.

GPS World News and Applications of the Global Position System, Apr. 1998, "Of Mutual Benefit: Merging GPS and Wireless Communications", p. 44-48.

Inside GNSS, Apr. 2006, "NovAtel Gets New Financial Marks, Launches First Galileo Receiver," p. 61.

Kaplan, Elliott D. "Understanding GPS Principles and Applications," p. 212-213, 220-223.

Lozow, J. B. Navigation: Journal of the Institute of Navigation, vol. 44, No. 1, Spring 1997, Analysis of Direct P(Y)-Code Acquisition, p. 89-97.

(Continued)

*Primary Examiner*—Thomas H Tarcza
*Assistant Examiner*—Nga X Nguyen
(74) *Attorney, Agent, or Firm*—Harness, Dickey & Pierce, P.L.C.

(57) ABSTRACT

A GPS transponder system incorporating a phase error monitoring and compensation subsystem. The phase error monitoring and compensation subsystem includes a demodulator subsystem that demodulates modulated carrier signals being output from each one of a pair of GPS transponders to obtain the navigation codes being generated by each of the transponders from their respective carrier signals. The navigation codes obtained from the modulated carrier signals are compared to separate navigation codes that are generated by a navigation data unit (NDU) of the system and supplied over a thermally stable signal transmission line. The signal transmission line has a known, fixed delay and is not affected by temperature changes that affect the modulated carrier signals. A phase comparator subsystem uses the comparison to generate needed error correction signals that are applied via phase shifters to each of the transponders. The error correction signals modify the modulated carrier signals to remove the influence caused by temperature variations that the transponders experience during operation.

21 Claims, 4 Drawing Sheets

OTHER PUBLICATIONS

Dierendonck, A.J. Van. Institute of Navigation Satellite Division's 4th International Technical Meeting. ION GPS-91, Albuquerque, MN, Sep. 9-13, 1991, "Novatel's GPS Receiver. The High Performance OEM Sensor of the Future."

DiEsposti, Raymond; Saks, Steven; Jocic, Lubo; Abbott, Anthony. The Aerospace Corporation. "The Benefits of Integrating GPS, INS, and PCS," p. 327-331.

DiEsposti, Raymond; DiLellio, James; Kelley, Clifford. Navigation Systems, The Boeing Company.; Dorsey, Arthur; Management & Data Systems, Martin, Lockheed; Fliegel, Henry, Berg, John; Edgar, Clyde, GPS JPO, The Aerospace Corporation; McKendree, Thomas, Navigation and Landing Systems; Fullerton, Raytheon; Shome, Pradipta, Office of Commercial Space Transportation, Federal Aviation Administration. ION NTM 2004, Jan. 26-28, 2004, San Diego, CA. "The Proposed State Vector Representation of Broadcast Navigation Message for User Equipment Implementation of GPS Satellite Ephemeris Progagation," p. 294-312.

* cited by examiner

SYSTEM AND METHOD FOR COMPENSATING FOR TEMPERATURE EFFECTS ON GPS TRANSPONDERS

FIELD

The present disclosure relates to GPS transponders, and more particularly to systems and methods for detecting and compensating for undesirable phase shifts in GPS navigation codes transmitted from a GPS transponder as a result of temperature influences acting on the transponder, to thus minimize the time uncertainty of the GPS navigation codes.

BACKGROUND

The statements in this section merely provide background information related to the present disclosure and may not constitute prior art.

The generation of precise signals used for position location is the Key Performance Parameter (KPP) and main mission objective of the entire Global Positioning System (GPS). The GPS System involves GPS transponders that are typically carried by space vehicles (satellites), orbiting the Earth. A GPS receiver calculates its location and time by receiving location and time reports from four different space vehicles. The user location and time is determined by the intersection of four spheres, of which the centers of each of the spheres are the four space vehicle locations. The radii of the spheres are calculated by multiplying the speed of light (approximately 300,000 Km per second) by the time delays between space vehicles and the user receiver. This computation yields the user (i.e., GPS receiver) location, as well as its time.

User Range Error (URE) is the position error tolerance expressed in units of length (meters) experienced by the user when a position location is calculated by a GPS receiver. The coordinates of the determined location will typically be accurate to within a circle of URE radius.

A significant contributor to the URE is the signal delay variation as a function of temperature within the navigation payload aboard the GPS space vehicles. In this regard it will be appreciated that the space vehicles that carry the GPS transponders typically experience widely varying temperatures throughout the day. These temperature variations have a significant impact on the GPS transponder (or transponders) carried by a given space vehicle. More specifically, the electronic components that comprise the GPS transponder experience significant temperature variations throughout every twelve hour orbit. These temperature variations can introduce significant phase uncertainty in the navigation codes transmitted from a GPS transponder. The phase uncertainty will typically give rise to a time delay uncertainty that is directly proportional to the phase uncertainty. The time delay uncertainty can significantly affect the accuracy of a location determination made by a GPS receiver that is receiving the GPS codes and using them to determine its real time location.

Addressing the above-described signal delay errors caused by thermal variations in a GPS transponder output can be especially important in military applications. For example, it is known that every nanosecond of delay uncertainty between each space vehicle and the user translates roughly to a 30 cm (roughly a 12 inch) position calculation error. In a military application, for example, pin-point accuracy of a GPS guided munition may be important in striking a target with the munition.

Presently, attempts to minimize the temperature variation problem have focused on using heater elements to try and maintain the components of a GPS transponder at a constant temperature. This has necessitated the additional use of DC power, thus increasing the number of batteries and solar cells on the space vehicle that is carrying the GPS transponder. The additional batteries and/or solar cells add weight, cost and significant complexity to the GPS satellite. The added weight of the batteries and solar cells further adds to the cost of launching the space vehicle into orbit.

SUMMARY

The present disclosure is directed to a system and method that enables the effect of temperature variations on delay uncertainty through a GPS transponder to be substantially reduced or entirely eliminated, thus significantly improving the URE of a location calculated by a GPS receiver.

In one embodiment the system includes a GPS satellite transponder that receives time and position information data from the ground. The GPS satellite transponder includes a navigation data unit (NDU) that generates GPS codes and impresses the data on to the codes. The GPS transponder then broadcasts the codes to remotely located GPS receivers using high frequency signals called carriers. In one specific embodiment a Navigation Data Unit (NDU) included on the GPS space vehicle generates the coded navigation and time data and the modulator impresses the coded data on the carrier signals.

The coded data at the output of the NDU is routed simultaneously inside the GPS transponder through different paths to one common point, and is received by a phase comparator subsystem of a phase shift compensation subsystem. One of the paths that the coded data takes is through a signal transmission line that has a known, fixed delay, and that is resistant to temperature changes. The other path of the coded data is through the various components making up the GPS transponder. Preferably the phase comparator is located close to an antenna feed point, or immediately prior to an input of the antenna that is being used to broadcast the coded data from the GPS transponder. Preferably just prior to the input to the antenna, a sample of the coded data is taken and routed to the phase comparator subsystem. Accordingly, the phase comparator subsystem receives the same coded data signal, but the signal arrives at the phase comparator subsystem by having traveled through different signal paths.

The phase shift compensation subsystem uses the phase difference information from the signal received over the transmission line and that from the signal that passed trough the transponder components to drive this difference essentially to zero. Thus, the phase shift compensation subsystem corrects the temperature induced phase shift of the transponder forcing it to always coincide with the fixed phase shift through the transmission line (which produces a known delay).

In one particular embodiment the signal transmission line is a glass transmission line. In another embodiment the signal transmission line is a fiber optic transmission line. Other thermally stable materials may be used as well.

In one embodiment the phase shift compensation subsystem includes a phase comparator for comparing the phases of the GPS navigation codes with the signal received from the signal transmission line. From this information the needed phase correction is determined and then applied via a phase shift subsystem to the signal path through the GPS transponder, where the phase shift correction operates to cancel the temperature induced phase shift affecting the phase of the navigation codes being generated by the GPS transponder.

In one embodiment the phase shift compensation system forms a closed loop system in which the needed phase corrections are applied to the transponder(s) in real time.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
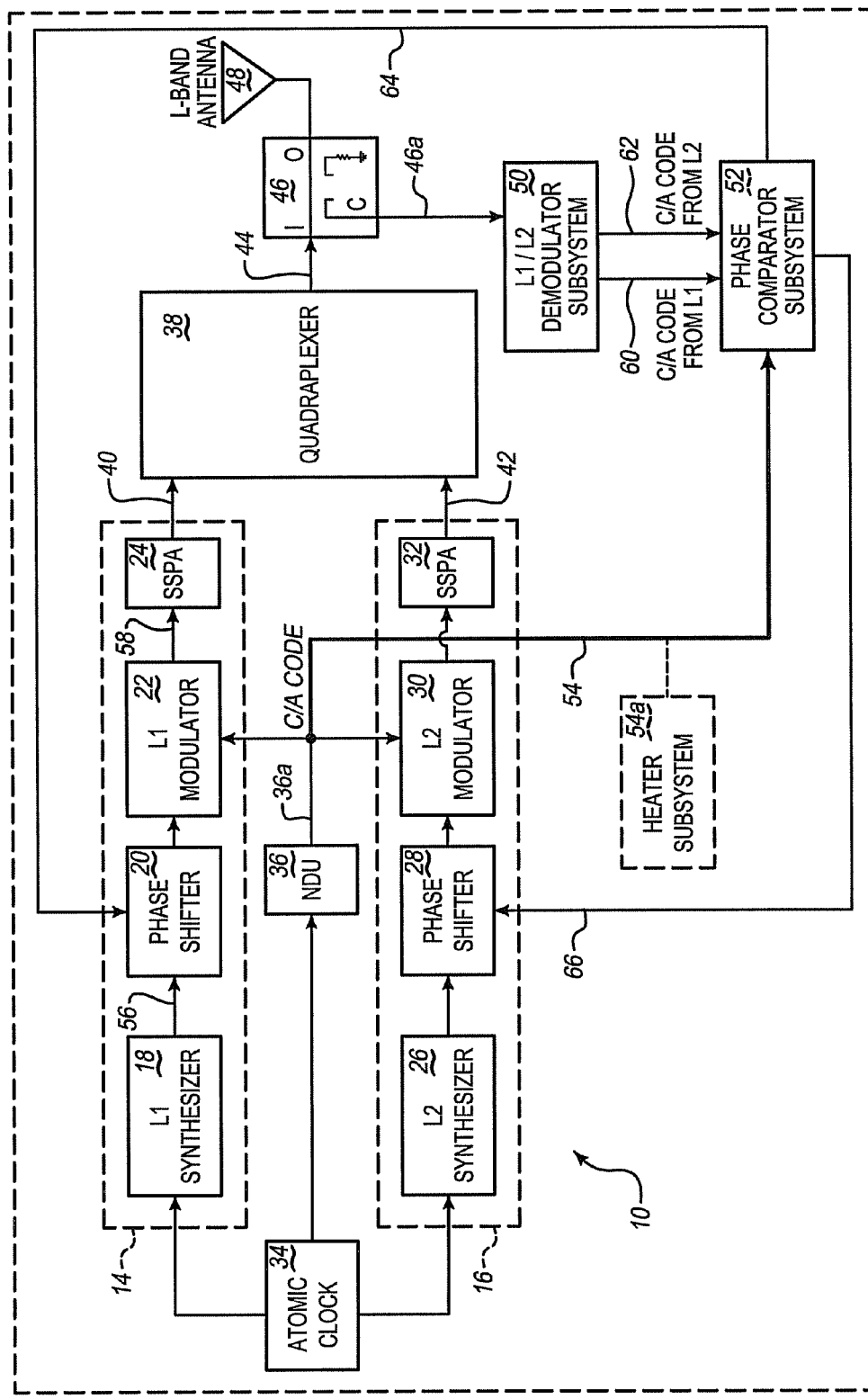
FIG. 1 is a block diagram of one exemplary embodiment of the present disclosure.

Referring to FIG. 1, one embodiment of a system 10 in accordance with the present disclosure is illustrated. The system 10 forms a dual transponder GPS system that is typically carried on a space vehicle such as a satellite, indicated by dashed line 12, that is orbiting the earth. The system 10, in this example, includes transponders 14 and 16. Transponder 14 includes a synthesizer 18, a phase shifter 20, a modulator 22 and a solid state power amplifier 24. Similarly transponder 16 includes a synthesizer 26, a phase shifter 28, a modulator 30 and a solid state power amplifier 32. An atomic clock 34 provides a highly accurate clock signal to a navigation data unit 36 and to the carrier synthesizers 18 and 26 of transponders 14 and 16, respectively. The navigation data unit 36 uses the clock signal from the atomic clock 36 to generate time stamped navigation signal information at its output 36a. The navigation signal information may be encoded using different encoding schemes. For example, the navigation signal information may be encoded as "Common Access" (C/A) codes, as "Precision" (P/(Y)) codes or as Military (M) codes. The C/A code is the most commonly used code, and for the purpose of discussion, it will be assumed that the system 10 produces C/A codes that include the time stamped navigation signal information. Thus, the system 10 is not limited to use with any one coding scheme.

A quadraplexer 38 is used for filtering and summing an output 40 from the first transponder 14 and an output 42 from the second transponder 16 to generate composite navigation signals that contain a modulated carrier signal with coded navigation data at its output 44. The modulated carrier signal at output 44 are then fed into a coupler 46 that provides an interface to an antenna 48 used for radiating the modulated carrier signal to a remotely located GPS receiver. The coupler 46 also provides a sample of the modulated carrier signal at output 46a to the demodulator subsystem 50 where the coded navigation data is recovered.

It will be appreciated immediately that while two GPS transponders 14 and 16 are illustrated in the drawing of FIG. 1, that the present system 10 and method is equally well adapted for use with only a single transponder. In GPS applications, however, typically a space vehicle, such as a satellite, will be carrying four GPS transponders. Thus, in a typical application, there would be four GPS transponders that are identical in construction to GPS transponder 14, that each has an output that feeds the quadraplexer 38. Thus, it will be appreciated that the system 10 is adapted for use with either a single GPS transponder, or virtually any plurality of GPS transponders as the needs of a particular GPS application may dictate.

With further reference to FIG. 1, the system 10 incorporates a phase compensation subsystem that enables temperature variations experienced by transponders 14, 16 and quadraplexer 38 that cause phase shifts (i.e., varying time delays) at the output 44 to be corrected. This is accomplished by the use of an additional demodulator subsystem 50, a phase comparator subsystem 52 and a signal transmission line 54 that is coupled to output 36a of the navigation data unit 36. Cooperatively, components 20, 28, 46, 50, 52 and 54 can be collectively viewed as forming the phase compensation subsystem.

To better understand the benefits provided by the phase compensation subsystem, a brief overview of the general operation of transponder 14 will be provided. It will be understood that transponder 116 operates in an identical fashion to transponder 14 but just at a different carrier frequency, and therefore will not be described separately. Transponder 14 receives a clock signal from the atomic clock 34 on an input of its synthesizer 18. The synthesizer 18 uses the clock to generate a carrier signal at its output 56. Assuming for the moment that the phase shifter 20 is not present, the output signal 56 would then be fed into the modulator 22. The modulator 22 also receives coded navigation signal information (i.e., common access, precision or military codes) from the navigation data unit 36 and impresses this information on to the carrier signal received from the synthesizer 18. From output 58 of the modulator 22, the modulated carrier signal is then fed into the solid state power amplifier 24 (or possibly a Traveling Wave Tube Amplifier (TWTA)) which amplifies the modulated carrier signal to a desired level. The output from the solid state power amplifier 24 is then fed to the quadraplexer 38 which filters and sums the modulated, amplified carrier signal with the output of the second transponder 16. Its output 44 containing the modulated carrier signals is routed to the coupler 46. The coupler 46, through its main path, routes the modulated carrier signals to the antenna 48 which radiates their energies as electromagnetic waves to a GPS receiver (not shown).

Due to temperature changes experienced by the transponder 14, as well as the quadraplexer 38, the modulated carrier signals from each of the transponders 14 and 16 may change in phase. Put differently, the coded navigation data impressed on the carrier signals from the two GPS transponders 14 and 16 may each have time delays that differ from one another by varying degrees, depending on the different temperatures affecting each transponder 14 and 16. Often the transponders 14 and 16 will be separated by a distance of one meter or more when mounted on the space vehicle, and thus during different points of orbit they may be subjected to different temperatures. Furthermore, the transponders 14 and 16 are often experiencing ambient temperatures that are changing in different ways (e.g., one may be experiencing an increasing temperature while the other is experiencing a decreasing temperature. Still further, the rates of temperature change that the transponders 14 and 16 are experiencing may not be the same. These changes in the ambient temperature being experienced by each transponder 14 and 16 cause changes in the temperatures of the electronic components of each transponder 14 and 16, which results in the phase uncertainties of the outputs of the transponders. The phase uncertainties (i.e., delay uncertainties) between the outputs of the transponders 14 and 16 can significantly affect the URE (User Range Error) of location information calculated by a GPS receiver that is using the navigation codes being received from the transponders 14 and 16 to compute location information. The phase compensation subsystem of the system 10 substantially reduces or virtually eliminates the phase error that is caused by temperature changes experienced by the electronic components making up the transponders 14 and 16, and the quadraplexer 38.

With further reference to FIG. 1, the operation of the system 10 with the benefit of the phase compensation subsystem will now be described. The coupler 46 is preferably located immediately prior to the input to the antenna 48 and, through its coupled output port 46a, feeds a small sample of the modulated carrier signals being provided at the output 44 of the quadraplexer 38 to the demodulator subsystem 50. This sample portion at output port 46a may be, for example, a signal having a power of only $1/100$ of the power of the signal that is being fed into the antenna 48. Accordingly, the coupler 46 does not tangibly reduce the power of the signal being output from the quadraplexer 38 to the antenna 48.

The demodulator subsystem 50 demodulates, from the carrier component of each carrier signal, the navigation codes (i.e., common access, precision, or military) that contain the navigation data from transponder 14, as well as those from transponder 16. The navigation codes (e.g., the common access codes used as examples in FIGS. 2 and 3) for each of the transponders 14 and 16 are provided as outputs 60 and 62 to inputs of the phase comparator subsystem 52. The phase comparator subsystem 52 also receives the navigation codes (e.g., the common access code) generated by the navigation data unit 36 at its output 36a from the signal transmission line 54. The phase comparator subsystem 52 compares the phase of the navigation codes received over the signal transmission line 54 with the phases of the navigation codes received via outputs 60 and 62. From these comparisons the phase comparator subsystem 52 generates independent phase correction signals that are output via signal lines 64 and 66 to the phase shifters 20 and 28, respectively. In this regard it will be appreciated that the navigation codes transmitted over the signal transmission line 54 will be virtually immune to influences from changing temperatures affecting the system 10. This is because of the construction of the signal transmission line 54, which is made from a material that is highly temperature stable. One suitable material for the signal transmission line 54 is glass. Thus, the signal transmission line 54 may be formed from a glass fiber optic conductor. Other suitable materials for the signal transmission line 54 are plastic or fused silica. Thus, while the components of the transponders 14 and 16 may be significantly affected by temperature changes, the signal transmission line 54 is not. Thus, the navigation codes provided via the signal transmission line 54 represent a "reference" that the phase comparator subsystem 52 may use to compare the navigation codes being received from each of the transponders 14 and 16 (as supplied via outputs 60 and 62).

The phase comparator subsystem 52 compares the navigation codes from outputs 60 and 62 with the navigation codes received over the signal transmission line 54 and generates suitable error correction signals that are applied to each of the phase shifters 20 and 28. The error correction signals effectively shift the phase of the carrier signals being output by each of the synthesizers 18 and 26, respectively, as needed to counteract the phase shift introduced by temperature changes affecting each of the transponders 14 and 16, and potentially the quadraplexer 38 as well. The phase compensation subsystem further operates as a closed loop system that is able to quickly react, in real time, to even small temperature changes that produce small phase shift errors in the modulated carrier signals being generated at the output 44 of the quadraplexer 38.

In the embodiment illustrated in FIG. 1, the phase comparator subsystem 52 may comprise an exclusive OR-gate circuit followed by a low pass filter that generates independent DC voltage outputs on signal lines 64 and 66. The DC voltages on signal lines 64 and 66 are each proportional to the phase difference detected between the navigation codes being output from the demodulator subsystem 50 and the navigation codes received over the signal transmission line 54.

It will be appreciated that while the system 10 reduces the influence of temperature changes affecting the transponders 14 and 16 to a level that is essentially negligible, that a conventional heating subsystem 54a as shown in FIG. 1 could nevertheless be used to heat the signal transmission line 54 and maintain it at an even more highly stable temperature. However, in the great majority of applications, the phase compensation subsystem with just the unheated signal transmission line 54 will be more than sufficient to counteract the adverse effects of temperature variations on the transponders 14 and 16.

Figure 2:
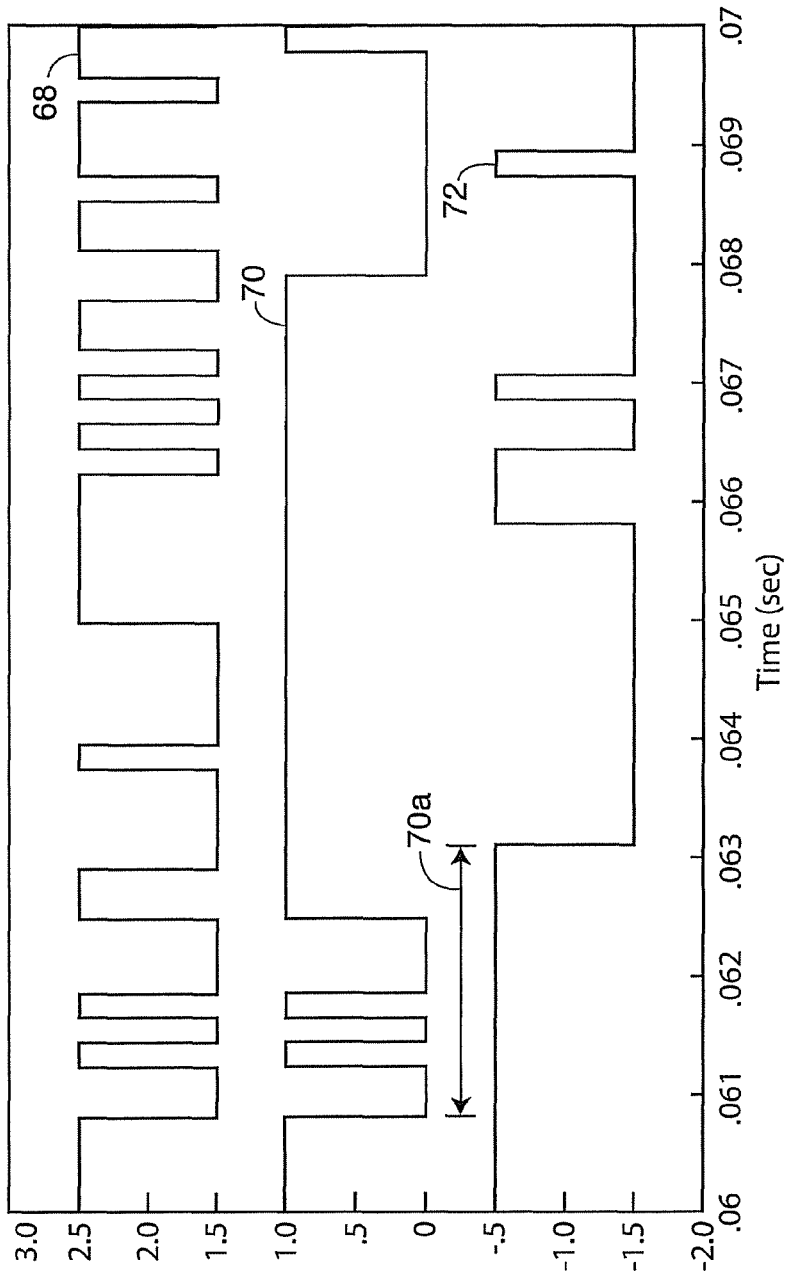
FIG. 2 is a graph illustrating exemplary output waveforms from a typical prior art transponder to show the phase shift being experienced by the navigation codes of a pair of transponders, relative to the navigation codes being output immediately from the navigation data unit.

With reference to FIG. 2, graphs of three waveforms 68, 70 and 72 are presented to illustrate the significant phase difference that can be introduced as the same signal travels through three different paths (fixed delay line and the two transponders). Waveform 68 represents the navigation data impressed on the common access code 68 being output by the navigation data unit 36 over the signal transmission line 54 (i.e., which has a fixed delay). Waveform 70 represents the same signal at output 60 (through transponder 14) while waveform 72 illustrates again the same signal at output 62 (through transponder 16). It can be seen that each of the waveforms 70 and 72 are shifted in phase and time from the waveform 68, as well as from each other. The simulated delays shown are representative only and were implemented in milliseconds for ease of computation. In an actual application of a GPS transponder, these delays would typically be on the order of nanoseconds. Although delays in nanoseconds may not sound significant, in the context of a GPS system a 1 nanosecond delay uncertainty will cause a location calculation error of about 30 centimeters to be realized by a GPS receiver.

Figure 3:
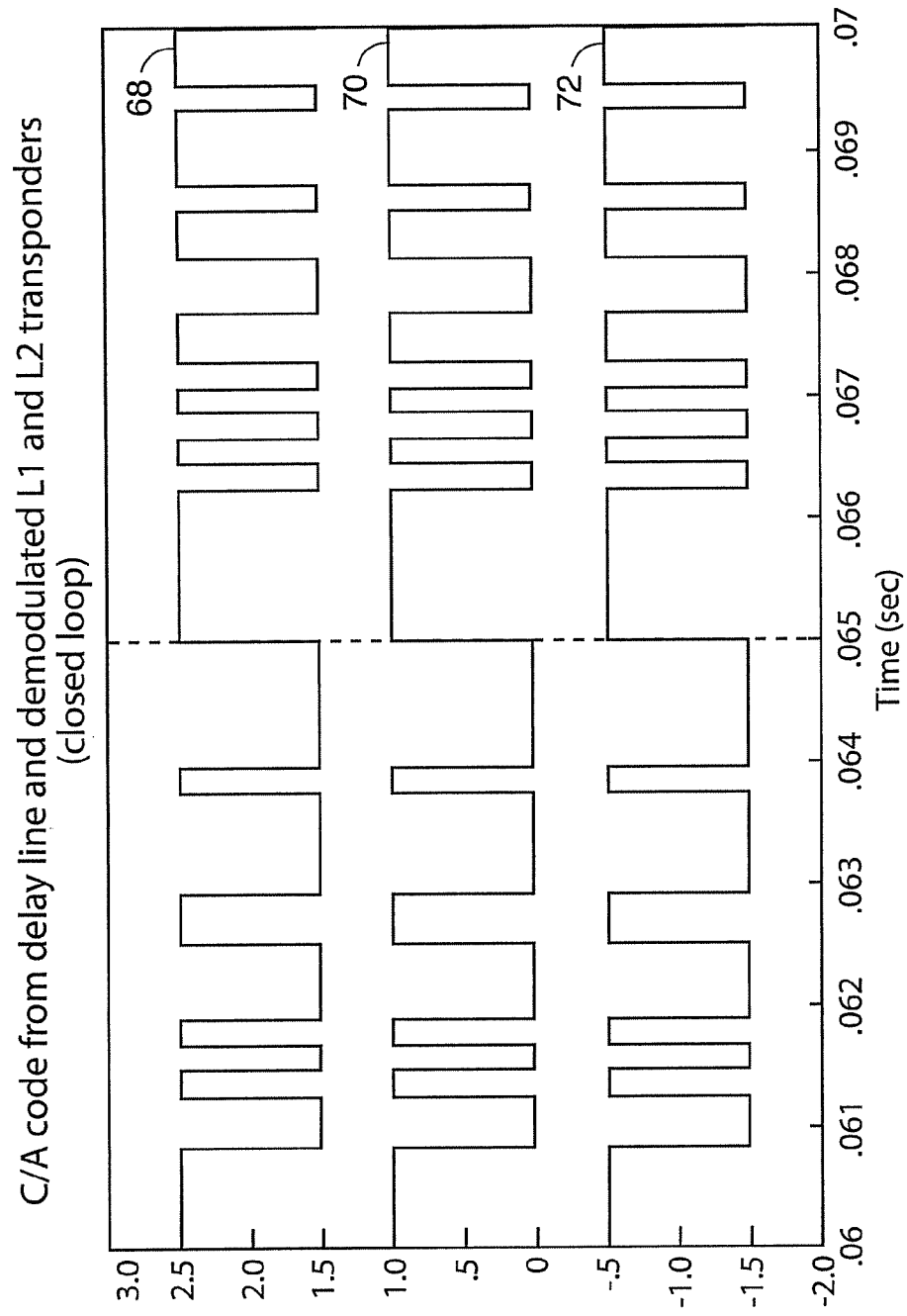
FIG. 3 is a graphs illustrating the waveforms shown in FIG. 2, but with the phase compensation subsystem of the present disclosure included to remove the time delay error from the signals generated by the two transponders.

With brief reference to FIG. 3, the same waveforms 68, 70 and 72 are shown illustrating the phase error correction provided by the phase compensation subsystem of the present system 10. It will be noted that the waveforms 68, 70 and 72 are in virtual phase and time alignment with one another. Accordingly, the phase error and time delay uncertainty shown in FIG. 2 have been removed from the coded data that are being output from the quadraplexer 46.

It will also be appreciated that while FIG. 1 illustrates an analog implementation of the system 10, that the system 10 could just as readily be constructed as an entirely digital system.

Figure 4:
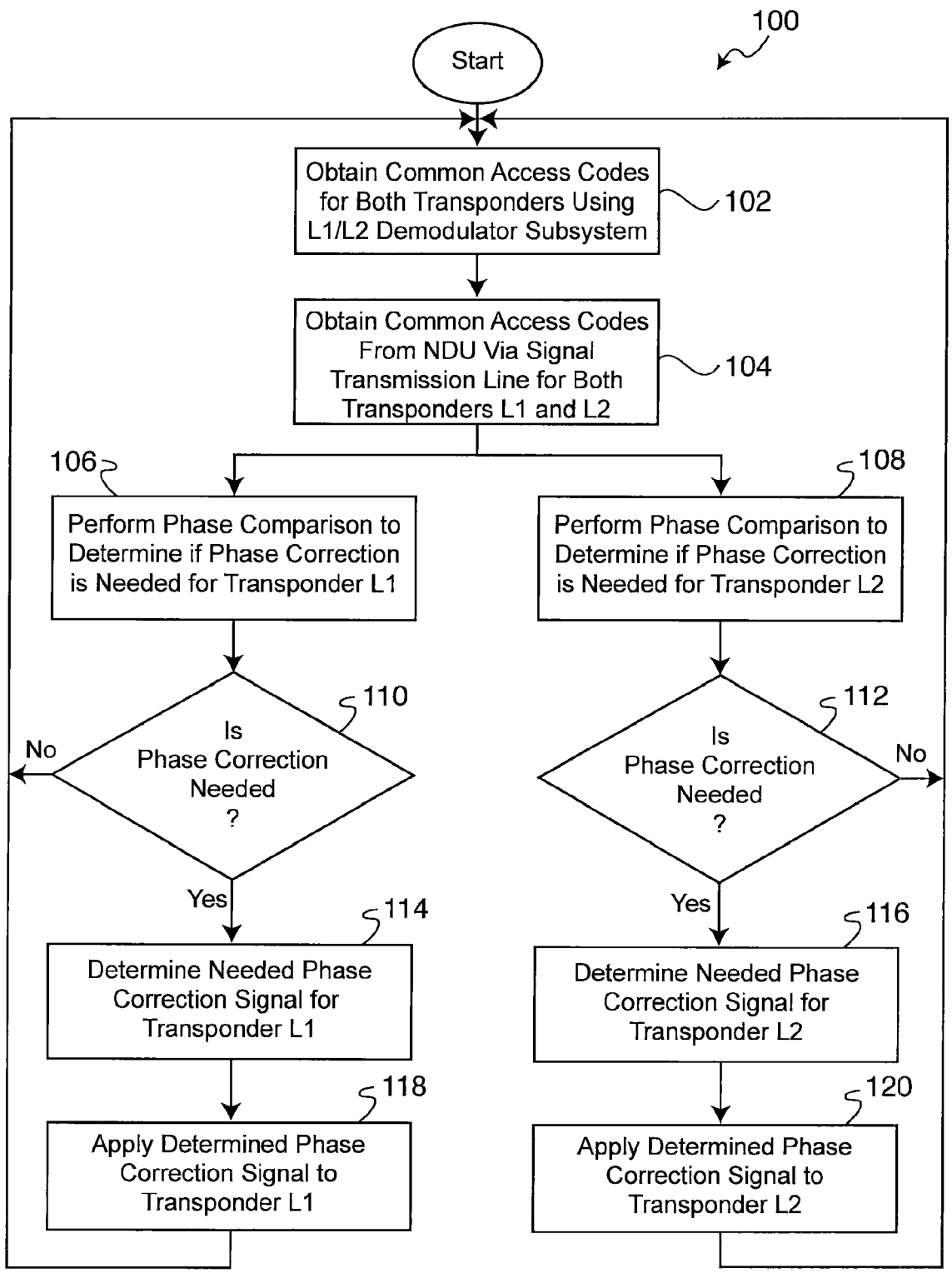
FIG. 4 is a flowchart illustrating major operations of the system shown in FIG. 1.

Referring briefly to FIG. 4, a flow chart 100 sets forth exemplary operations performed by the system 10, and more particularly by the phase compensation subsystem. Initially at operation 102, the demodulator subsystem 50 is used to obtain the navigation codes (common access codes being used as an example) being transmitted from both of the transponders 14 and 16. At operation 104, the common access codes being generated by the navigation data unit 36, and supplied over the signal transmission line 54, are obtained. At operations 106 and 108, which are performed substantially simultaneously, phase comparisons are made that compare the common access codes from the transponders 14 and 16, respectively, to the common access codes being provided via the signal transmission line 54. At operations 110 and 112, inquiries are made to determine if a phase correction is needed for the modulated carrier signal being generated by either of the transponders 14 or 16. If the inquiry at operation 110 produces a "Yes" answer, then the needed phase correction for the first transponder 14 (L1) is calculated by the phase comparator subsystem 52, as indicated at operation 114. Similarly, if operation 112 determines that a phase correction is needed for the modulated carrier signal being output from transponder 16 (L2), then the required phase correction is determined by the phase comparator subsystem 52 as indicated at operation 116. At operations 118 and 120 the determined phase correction signals are applied to the transponders 14 and 16. Operations 102-112 are then repeated to determine if new phase corrections are needed.

A significant advantage is that phase correction signals may be updated by the system 10 in real time to account for even small, rapidly changing temperatures affecting the transponders 14 and 16. Typically, one cycle through the operations 102-120 may take only a few milliseconds.

The system 10 and method of the present disclosure thus is able to detect and eliminate the effects of temperature changes on the transponders of a GPS system that could otherwise significantly affect the time accuracy of coded navigation data transmitted by the GPS system to a GPS receiver. A significant advantage of the system 10 and method of the present disclosure is that the additional components needed to perform the phase comparison and correction operations are relatively inexpensive, do not significantly increase the complexity of the overall GPS system, and importantly do not significantly increase the overall weight and DC power consumption of the GPS transponder system. This is in contrast to previous attempts to address the phase error problem by using battery powered heaters in an attempt to maintain the transponders at a constant, predetermined temperature. The use of battery powered heaters adds significant cost and weight to a GPS transponder system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for reducing or substantially eliminating user range error in global positioning system (GPS) signals due to temperature changes experienced by a GPS transponder, the system comprising:
   a GPS transponder for generating a modulated carrier signal that includes GPS coded navigation data that is transmitted to a remotely located GPS receiver, the GPS transponder having an input and an output;
   a signal transmission line that is resistant to temperature changes;
   a navigation data unit for supplying navigation codes to said input of said GPS transponder and also to said signal transmission line; and
   a phase shift compensation subsystem that uses said navigation codes received over said signal transmission line to determine a temperature induced phase shift affecting said modulated carrier signal being output from said transponder, and that applies a phase shift to said modulated carrier signal to remove said temperature induced phase shift.

2. The system of claim 1, wherein said phase shift compensation subsystem comprises:
   a coupler for obtaining a sample of said modulated carrier signal being output by said transponder;
   a demodulator for demodulating said sample of said modulated carrier signal received from said coupler, to thus obtain navigation codes therefrom;
   a phase comparator for comparing a phase of said navigation codes; from said signal transmission line with a phase of said navigation codes that are demodulated from said sample of said modulated carrier signal obtained from said coupler; and
   a phase shifter responsive to said phase comparator for shifting a phase of said modulated carrier signal being output from said transponder to remove a temperature influence affecting a phase of said modulated carrier signal.

3. The system of claim 1, wherein said signal transmission line comprises a glass transmission line.

4. The system of claim 3, wherein said glass transmission line comprises a fiber optic transmission line.

5. The system of claim 2, wherein said transponder comprises a synthesizer for receiving signals from a clock and generating a carrier signal therefrom, and a modulator that impresses said navigation codes from said navigation data unit onto said carrier signal to produced said modulated carrier signal; and
   wherein said phase shifter is connected between said synthesizer and said modulator to modify a phase of said carrier signal prior to said carrier signal being input to said modulator.

6. The system of claim 5, further comprising a power amplifier for receiving an output of said modulator and amplifying said output from said modulator.

7. The system of claim 1, further comprising an antenna responsive to said transponder output for radiating wireless navigation signals in accordance with said modulated carrier signal from said GPS transponder.

8. The system of claim 1, wherein said system forms a closed loop monitoring and control system for applying said phase shift to said modulated carrier signal in real time.

9. The system of claim 1, further comprising a heater element coupled to said signal transmission line that maintains said signal transmission line at a highly stable temperature.

10. The system of claim 2, further comprising:
    a second GPS transponder; and
    a second phase shifter responsive to said phase comparator for shifting a phase of a carrier signal being generated by said second GPS transponder.

11. A method for reducing or substantially eliminating user range error (URE) in global positioning system (GPS) signals due to temperature changes experienced by a GPS transponder, the method comprising:
    a) supplying navigation codes to a GPS transponder and generating a first output forming a modulated signal from said GPS transponder;

b) supplying said navigation codes to a thermally stable signal transmission line and generating a second output from said thermally stable signal transmission line; and c) using said first and second outputs to determine a phase shift correction that needs to be applied to said modulated signal to remove a temperature influence affecting said modulated signal.

12. The method of claim 11, wherein operation c) comprises:

comparing a phase of said first and second outputs to determine a phase difference between said first and second outputs; and using said phase difference to generate said phase shift correction.

13. The method of claim 11, further comprising:

applying said phase shift to an input of said GPS transponder to modify a phase of said modulated signal.

14. The method of claim 11, wherein generating said phase shift correction comprises using a phase shifter to modify a phase of a carrier signal before impressing said navigation codes onto said carrier signal to form said modulated signal.

15. The method of claim 11, wherein operation b) comprises supplying said navigation codes to a glass transmission line.

16. The method of claim 11, wherein operation b) comprises supplying said navigation codes to a fiber optic transmission line.

17. The method of claim 11, further comprising using a heater to maintain said thermally stable signal transmission line at a predetermined temperature.

18. A method for minimizing user range error (URE) in global positioning system (GPS) signals due to temperature changes experienced by a GPS transponder, the method comprising:

a) supplying navigation codes to a GPS transponder and generating a first output from said GPS transponder;

b) supplying said navigation codes to a thermally stable signal transmission line and generating a second output from said thermally stable signal transmission line; and c) using said first and second outputs to determine a phase difference between said outputs, said phase difference being indicative of an influence of temperature affecting said GPS transponder.

19. The method of claim 18, further comprising using said determined phase difference to generate a phase correction signal, and applying said phase correction signal to said GPS transponder to modify a phase of said first output.

20. The method of claim 18, wherein operation b) comprises supplying said navigation codes to a glass transmission line.

21. The method of claim 18, further comprising using a heater to maintain said thermally stable signal transmission line at a highly stable temperature.

\* \* \* \* \*